No. 701,018. Patented May 27, 1902.
S. E. DIESCHER.
SHAFT COUPLING, &c.
(Application filed Sept. 3, 1901.)

(No Model.) 2 Sheets—Sheet 1.

WITNESSES: INVENTOR
Samuel E. Diescher
by Dannie S. Wolcott Att'y.

No. 701,018. Patented May 27, 1902.
S. E. DIESCHER.
SHAFT COUPLING, &c.
(Application filed Sept. 3, 1901.)
(No Model.) 2 Sheets—Sheet 2.

WITNESSES: INVENTOR
Samuel E. Diescher
by Dennis S. Wolcott Att'y.

UNITED STATES PATENT OFFICE.

SAMUEL E. DIESCHER, OF PITTSBURG, PENNSYLVANIA.

SHAFT-COUPLING, &c.

SPECIFICATION forming part of Letters Patent No. 701,018, dated May 27, 1902.

Application filed September 3, 1901. Serial No. 74,058. (No model.)

*To all whom it may concern:*

Be it known that I, SAMUEL E. DIESCHER, a citizen of the United States, residing at Pittsburg, in the county of Allegheny and State of Pennsylvania, have invented or discovered certain new and useful Improvements in Shaft-Couplings, Pulleys, Clutches, &c., of which improvements the following is a specification.

The invention described herein relates to certain improvements in mechanism for connecting adjacent ends of shafts and also for detachably securing pulleys to shafts; and, in general terms, the invention consists in the employment of spiral gripping members carried by a shell or sleeve which may form the hub of the pulley and adapted to be secured to the shaft or shaft-sections.

The invention is hereinafter more fully described and claimed.

Figure 1:
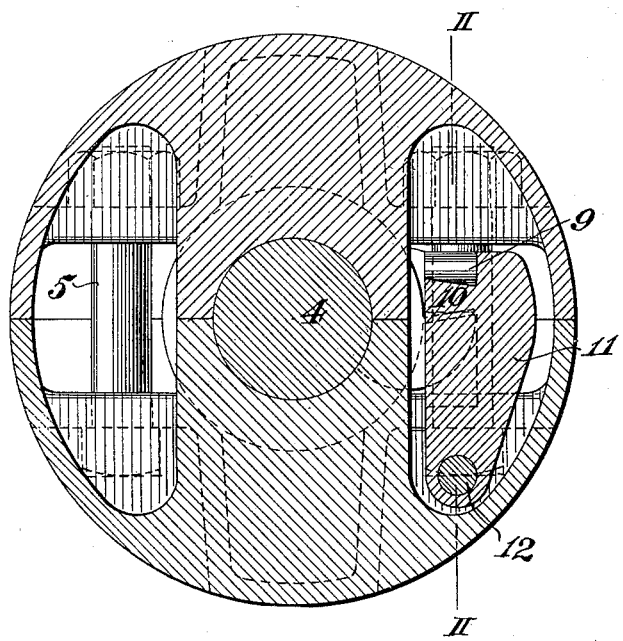
Figure 2:
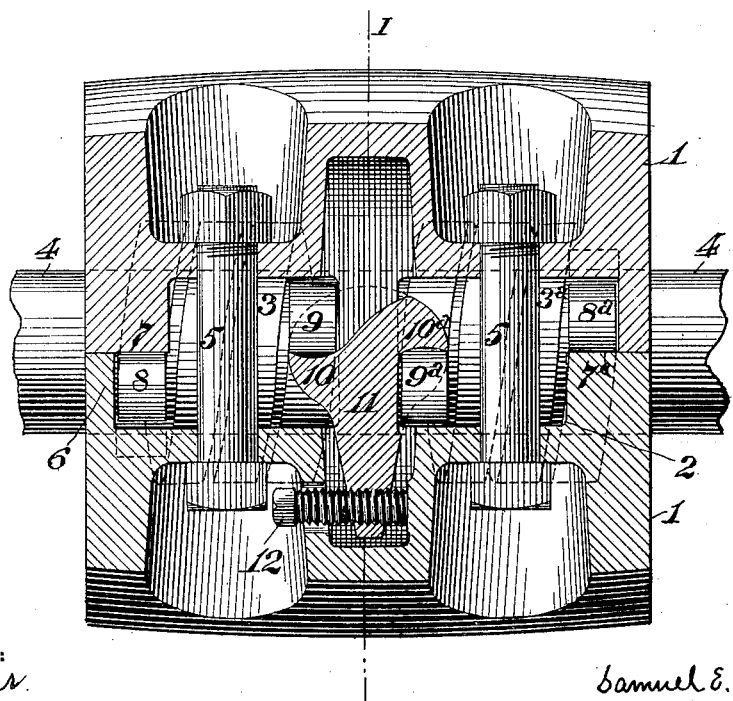
Figure 3:
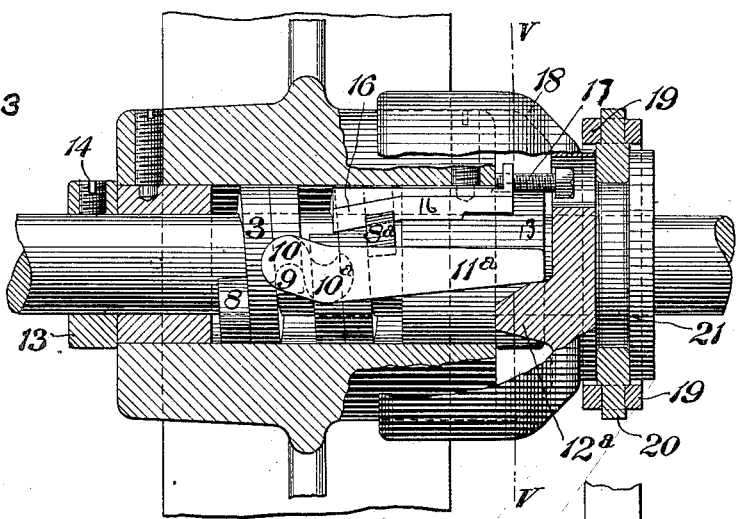
Figure 4:
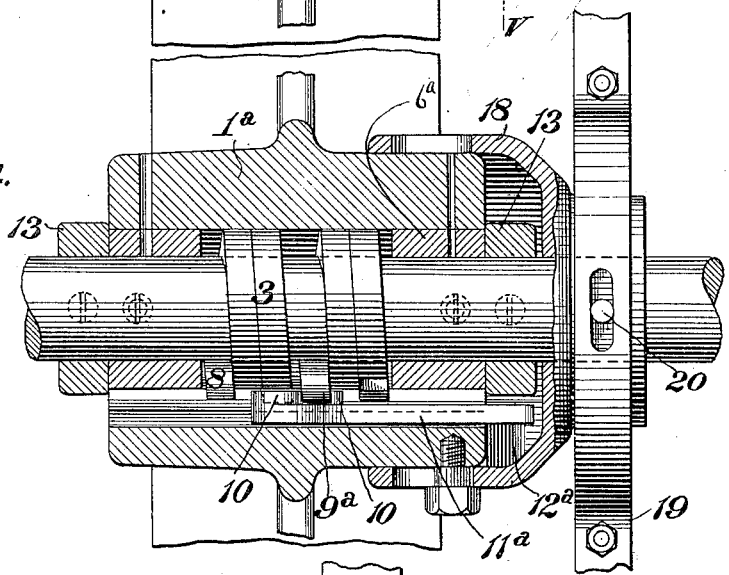
Figure 5:
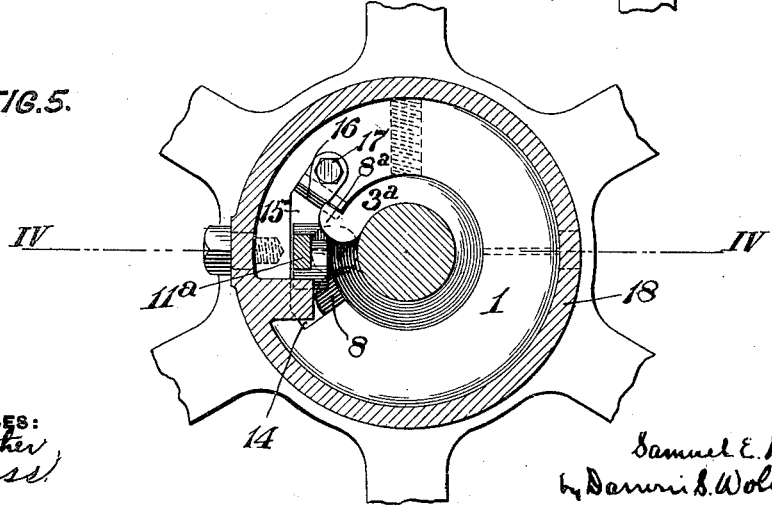

In the accompanying drawings, forming a part of this specification, Figure 1 is a section elevation on the plane indicated by the line II, Fig. 2, illustrating the application of my improvement to the connecting of sections of shafts. Fig. 2 is a sectional view of the same on a plane indicated by the line II II, Fig. 1. Fig. 3 is a view, partly in section and partly in elevation, showing the application of my improvement to connecting pulleys to shafts. Fig. 4 is a sectional view of the same on the plane indicated by the line IV IV, Fig. 5; and Fig. 5 is a sectional view on the plane indicated by the line V V, Fig. 3.

In the practice of my invention I employ a shell or sleeve 1, having suitable recesses 2 therein for the reception of the gripping-coils 3 $3^a$. When employing my improvement for connecting the adjacent ends of shaft-sections 4, the shell or sleeve 1 is made in two parts or sections which are adapted to be drawn together by means of bolts 5, as clearly shown in Figs. 1 and 2. The sections of the shell or sleeve are provided at their ends with bearing portions 6, adapted to bear upon or to form seats for the shaft-sections. Each of the shell-sections is provided with seats or abutments 7 $7^a$, against which shoulders 8 $8^a$ on the outer ends of the coils 3 $3^a$ will have a firm bearing. Suitable means are employed whereby a pull may be exerted on the opposite ends of the coils to cause the latter to grip the shaft. This mechanism should be so constructed that the coils will grip the shaft with approximate equality. This equality of grip can be conveniently effected by forming shoulders 9 $9^a$ on the inner ends of the coils, said shoulders being adapted to bear against shoulders or abutments 10 $10^a$, formed on opposite sides of the axial line of a lever 11. This lever is of the type or class known as a "floating" lever—*i. e.*, one having no permanent or fixed fulcrum or center of movement. The outer or power end of the lever is adapted to be shifted, so as to tighten the coils upon the shaft-sections, by a suitable mechanical device, which in the construction shown in Figs. 1 and 2 is formed by a screw 12, passing through a threaded opening in the end of the lever and bearing against a wall of the sleeve. It will be readily understood by those skilled in the art that when the coupling has been applied to the ends of two adjacent shaft-sections and the screw 12 is turned, so as to tighten the coils upon the shaft-sections, the lever will have its fulcrum or center of movement first on one of the shoulders, as 9, and then upon the other shoulder—as, for example, if one of the coils, as 3 in Fig. 2, is a little larger than the other coil the fulcrum of the lever in such case will at first be formed by the shoulder or abutment $9^a$ on the coil $3^a$ until the coil 3 takes a bearing on the shaft. Thereafter the abutment 9 on the coil 3 will form the fulcrum until the coil $3^a$ also bears equally upon the shaft. This construction will insure an equal tension to both of the coils upon their respective shaft-sections and a firm gripping of the shaft by both.

In applying my improvement to clutches for pulleys the hub $1^a$ of the pulley forms the inclosing shell or sleeve for the coils, and the bearings whereby the sleeve or shell is kept in alinement with the shaft are formed, preferably, by blocks $6^a$, which fit the shaft snugly, but with a freedom of rotation thereon. The shell or case $1^a$ is held from movement longitudinally on the shaft by any suitable means—such, for example, as the collars 13, secured to the shaft by screws 14. As clearly shown in Figs. 4 and 5, the shell or case $1^a$ is recessed, as at 15, for the reception of the abutments or shoulders 8 8ª and 9 9ª on the ends of the coils 3 3ª and the adjusting-lever 11ª. The abutment or shoulder 8 at the outer end of one of the coils, as 3, rests against the side wall of the recess 15, while the abutment 8ª at the outer end of the other coil, 3ª, rests against a wedge-block 16, which is adapted to be shifted by means of a screw 17, as clearly shown in Figs. 3 and 5. By means of this wedge-block or coil-adjuster any undue looseness or slack of the coils can be taken up, so as to prevent an unnecessary movement of the lever when tightening the coils on the shaft. In order to shift the outer or power end of the lever, it is preferred to employ an abutment 12ª, movable longitudinally of the shaft by any suitable means. In the construction shown in Figs. 3, 4, and 5 this abutment is formed within a shell or sleeve 18, adapted to move freely along the shaft and preferably extending over one end of the shell or case, so as to protect the gripping mechanism from dust and dirt. This sleeve is adapted to be moved by means of a lever 19, having arms passing around the sleeve and engaging trunnions 20, formed on the divided collar 21, fitting within a groove on the sleeve. This is the usual construction for shifting the movable members of a clutch mechanism. The shoulder 12ª is provided with an inclined face, as shown, so that by the inward movement of the sleeve 18 the lever 11ª will be so shifted as to tighten the coils 3 upon the shaft.

I claim herein as my invention—

1. The combination of a case or shell, two gripping-coils arranged within the case or shell, each coil having one end engaging a portion of the case or shell, a lever engaging the other ends of the coils and means for shifting the lever, substantially as set forth.

2. The combination of a case or shell, two gripping-coils arranged within the case or shell, each coil having one end engaging a portion of the case or shell, a floating lever engaging the other ends of the coils and means for shifting the lever, substantially as set forth.

3. The combination of a case or shell, having oppositely-arranged abutments, means for adjusting one of said abutments, two gripping-coils arranged within the case or shell, one end of each coil having a bearing against said abutments, a floating lever engaging the other ends of the coils and means for shifting said lever, substantially as set forth.

4. The combination of a case or shell, two gripping-coils arranged within the case or shell and means for causing both coils to have an equal gripping action, substantially as set forth.

In testimony whereof I have hereunto set my hand.

SAMUEL E. DIESCHER.

Witnesses:
F. E. GAITHER,
DARWIN S. WOLCOTT.